Jan. 2, 1940.   R. W. REGENSBURGER   2,185,949
HOG STUNNING PEN
Filed Sept. 23, 1936   3 Sheets-Sheet 2

Richard W. Regensburger
INVENTOR

ATTEST -
Norbert E Birch
Wm C. Meiser

BY
ATTORNEY

Jan. 2, 1940.    R. W. REGENSBURGER    2,185,949
HOG STUNNING PEN
Filed Sept. 23, 1936    3 Sheets-Sheet 3
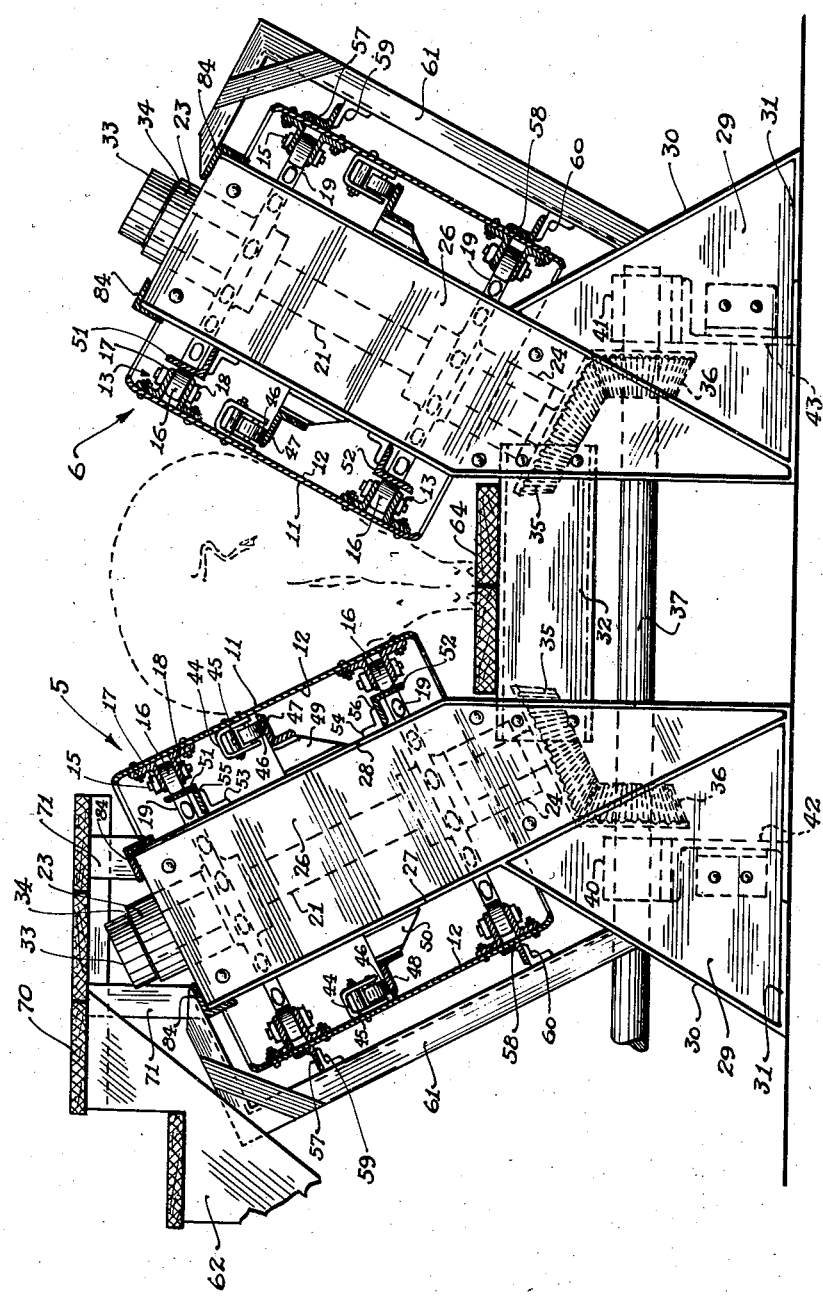
Fig. 3
Richard W. Regensburger
INVENTOR
ATTEST
BY 
ATTORNEY Patented Jan. 2, 1940

2,185,949

UNITED STATES PATENT OFFICE 2,185,949

HOG STUNNING PEN

Richard W. Regensburger, Chicago, Ill., assignor to Institute of American Meat Packers, Chicago, Ill., a corporation of Illinois Application September 23, 1936, Serial No. 102,199

4 Claims. (Cl. 17—1)

This invention relates to stunning pens for use in slaughtering animals.

One of the objects of the invention is to provide an improved stunning pen for use in slaughtering animals.

Another object of the invention is to provide transfer mechanism for supporting living animals in a quiescent position appropriate for stunning while being carried to the shackling pen.

Another object of the invention is to provide a substantially V-shaped conveying means comprising spaced, oppositely disposed endless conveyors for supporting living animals in a quiescent, upright position appropriate for stunning while being conveyed to the shackling pen.

Other objects of the invention will be apparent from the description and claims which follow.

For convenience, the invention will be described as used in connection with the slaughtering of hogs. It will be understood, however, that this is merely by way of illustration and not by way of limitation since the invention may be practiced in and about the slaughter of other animals and for other purposes.

In conventional abattoir practice, hogs to be slaughtered are driven in numbers into an enclosure called a shackling pen. The shackling pen is provided with an elevating means, usually a large revolving wheel. In the shackling pen an operator, designated as a shackler, shackles each hog by seizing one hind leg, wrapping a length of chain about the leg, forming a bight and securing a hog at the end of the chain to the standing part of the chain. The free end of the chain, which is provided with means adapted to slide upon a rail, is hung upon a lug on the face of the wheel. The revolving wheel carries the animal from the floor. On the downward sweep of the wheel, the shackle is hooked onto a rail inclined sufficiently to cause the suspended animal to slide, by the action of gravity, to the killing station, at which point an operator inserts a knife into the throat of the hog and severs the blood vessels.

In large scale slaughtering operations it is impractical to stanchion individually each animal for stunning due to the quantity of equipment and labor which would be required. The animals are naturally excited in the strange atmosphere of the packing house. It is, therefore, desirable that the animals be suitably restrained during the stunning operation in order that the head of the animals may be relatively quiet for the satisfactory application of the stunning means.

The present invention provides means for restraining hogs and for successively and automatically conveying the restrained hogs in a quiescent, upright position for stunning and subsequently to the shackling pen. In accordance with the present invention the restrained hogs are held as securely as if individually stanchioned while being so conveyed.

In the use of the present invention, the restrained animals may be stunned either by use of electrical stunning means or by a sudden blow to the head. By way of illustration, but not by way of limitation, the stunning operation will be exemplified with the use of electrical stunning tongs.

In the accompanying drawings, similar reference characters in the several figures designate similar parts.

Figure 3 is an enlarged sectional view of the conveying means taken on lines 3—3 of Figures 1 and 2.

Figure 1:
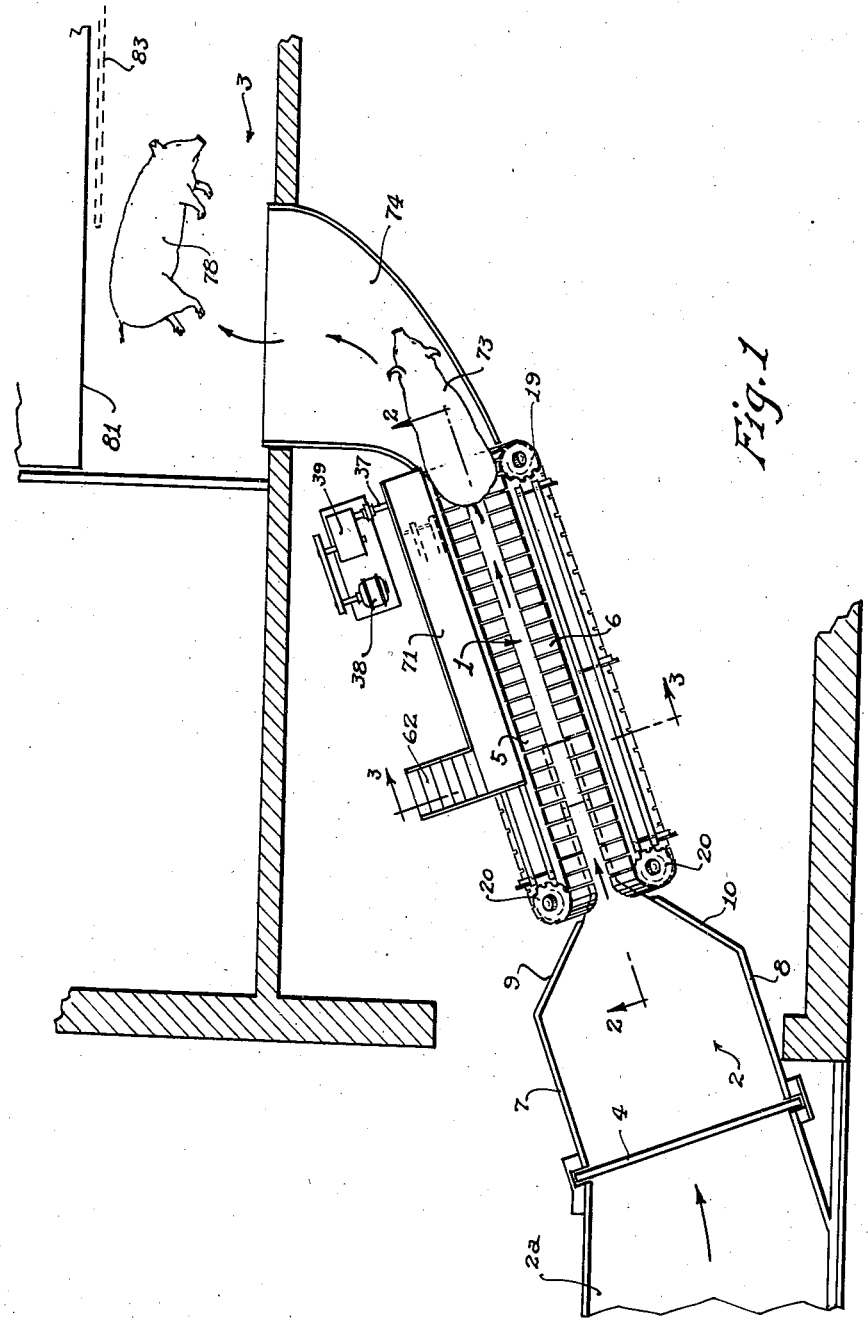
Figure 1 is a plan view of a stunning pen constructed in accordance with the present invention.

In Figure 1, a stunning pen 1, constructed in accordance with the present invention, is shown positioned between enclosures 2 and 3, respectively designated as the feed pen and the shackling pen. Feed pen 2 is constructed adjacent enclosure 2a, designated as the holding pen, and is separated from auxiliary feed pen 2a by lift gate 4. Feed pen 2, while not necessary to the successful operation of stunning pen 1, has been found desirable for separating the animals into small groups of approximately 8 to 10 prior to their entrance between conveyors 5 and 6 forming stunning pen 1. Side walls 7 and 8 of feed pen 2, as they approach stunning pen 1, are converged inwardly as at 9 and 10 toward conveyors 5 and 6 for directing the animals within stunning pen 1.

Conveyors 5 and 6 are preferably of the endless type and are cooperatively and longitudinally arranged in spaced substantially V-shaped relationship. Conveyors 5 and 6 may be formed of any suitable material. In practice, however, conveyors of the tractor type, formed of plates 11 successively connected and arranged to form substantially continuous conveying surfaces, have been found most practical and efficient for supporting the heavy weights of the animals.

Figure 4:
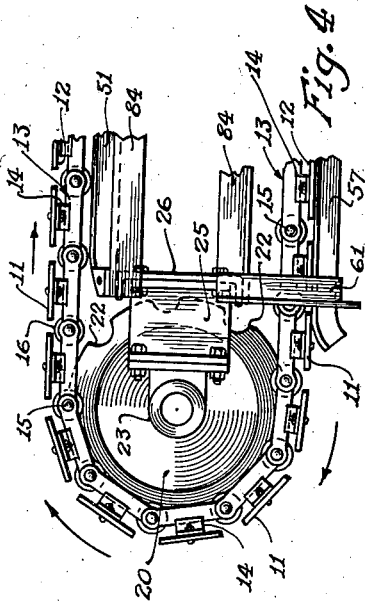
Figure 4 is a detail of an idler sprocket wheel showing the chain and conveyor arrangement.

It will be noted by reference to Figure 4 that chain 13 is provided with brackets 14, welded or otherwise rigidly secured to the non-conveying surfaces 12 of plates 11, adjacent the opposite ends thereof. Chain 13 is formed by a plurality of opposed members 17 and 18 pivotally connected by pins 15 upon which are mounted rollers 16.

Conveyors 5 and 6 travel over drive sprockets 19 and idler sprockets 20. The drive sprockets 19 are shown in Figure 3.

Sprockets 19 are pinioned or otherwise secured to shaft 21 in spaced relationship and are provided at their peripheral edges with teeth 22 of suitable thickness for mesh with chain 13.

Shafts 21 are journaled within bearings 23 and 24, bolted or otherwise secured to brackets 25, rigidly secured to plates or channels 26, provided with flanges 27 and 28. Plates 26 are welded to supporting plates 29 provided with flanges 30 and 31. Conveyors 5 and 6 are rigidly held in spaced relationship at their lower edges by channels 32 welded or otherwise secured between opposed plates 26. Supporting channels or plates 26 are longitudinally braced by members 84. Collars 33 are pinioned or otherwise secured to the ends of shafts 21 and ride upon faces 34 of bearings 23 to carry the thrust load of shafts 21.

Shafts 21 are suitably driven through the medium of beveled gears 35 in mesh with beveled gears 36 pinioned or otherwise secured to shaft 37, which shaft 37 is driven by power transmitted from motor 38 through speed reducer 39. Shaft 37 is journaled within bearings 40 and 41, rigidly mounted upon channels 42 and 43, bolted or otherwise secured to plates 29.

The mounting of idler sprockets 20 is in every respect identical with drive sprockets 19 with the one exception, that the drive elements comprising the gears 35 and 36 and drive shaft 37 and so forth, are omitted.

U-shaped brackets 44 are rigidly secured at their side arms 45 to the non-conveying surfaces 12 of each of the plates 11. Brackets 44 are arranged in horizontal alignment and serve to carry antifriction rollers 46, which rollers 46 ride upon tracks 47 and 48 during movement of conveyors 5 and 6. Rollers 46 serve to partially support belts 5 and 6 against vertical displacement by which the stress normally placed upon sprockets 19 and 20 is materially relieved. Tracks 47 and 48 extend the length of conveyors 5 and 6 between sprockets 19 and 20 and are welded or otherwise secured through the agency of brackets 49 and 50 to channels 26.

The forward flights of the conveying surfaces of conveyors 5 and 6 as they extend between sprockets 19 and 20, are rigidly maintained in a constant plane by means of rollers 16 in engagement with the tracks 51 and 52. Tracks 51 and 52 are rigidly secured to plates 26 by clip angles 53 and 54, as at 55—56. The ends of tracks 51 and 52 are flared slightly inwardly adjacent sprockets 19 and 20 to facilitate guiding of the rollers 16 thereon.

The conveyors 5 and 6, as they extend between sprockets 19 and 20, are also maintained in a constant plane during their return flight by angle guides 57 and 58 in engagement with the outer surfaces of the conveyors 5 and 6. Guides 57 and 58 are rigidly secured to standards 61 by clip angles 59 and 60. Standards 61 are rigidly secured to supporting plates 26 and 29.

Figure 2:
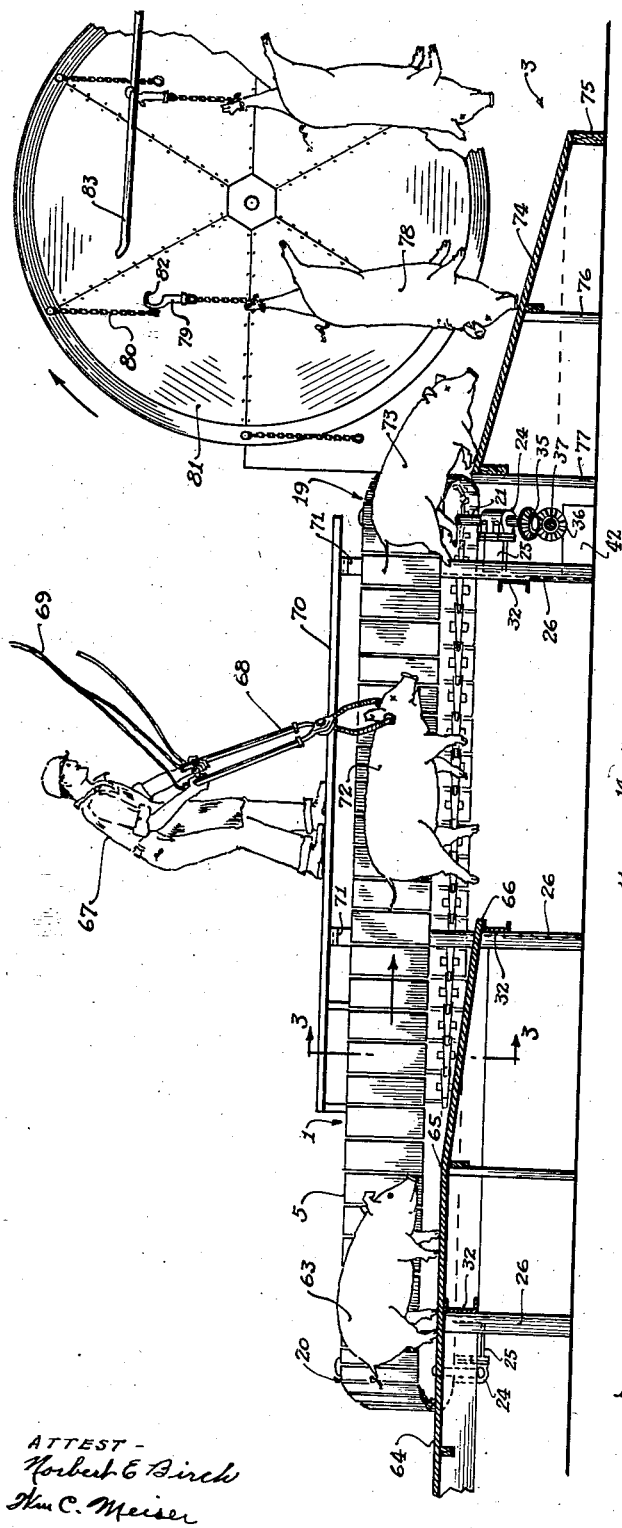
Figure 2 is a side view, partly in section, taken on line 2—2 of Figure 1.

As shown in Figure 2 of the drawings, the floor or platform 64 of feed pen 2 is extended a suitable distance beneath conveyors 5 and 6 such that the animal upon first entering stunning pen 1 is enabled to continue under his own power without engagement with either of the conveyors 5 or 6. This prevents frightening and turning back of the animal. The floor 64, at a suitable point, as at 65, beyond the entrance to stunning pen 1, is gradually inclined downwardly to a point 66 at which the floor 64 is completely terminated. The animal 63, after passing the point 65 in the floor 64, is gradually lowered in wedging relationship between the conveyors 5 and 6, and after passing the point 66 in the floor 64 is, by the action of gravity, completely wedged between belts 5 and 6 and is suitably restrained in a quiescent upright position appropriate for stunning.

In Figure 2 an operator 67 is shown manipulating a pair of tongs 68 provided with electrodes supplied with current through line 69. The operator may stand upon a suitable platform 70 mounted upon either side of the stunning pen, supported by standards 71. Platform 70 is provided with stairway 62 leading from the floor. Conveyors 5 and 6 may be remotely operated by operator 67 through a contact switch suitably attached to the stunning instrument 68.

The animal, designated by the numeral 72, is shown completely wedged between the conveyors 5 and 6 and at a suitable point for stunning by the operator. If desired, the animal may be stunned while traveling under his own power on floor 64 between conveyors 5 and 6 because in that space he is suitably restrained by the confines of the conveyor. The stunned animal is conveyed to the discharge end of stunning pen 1. At the discharge end of stunning pen 1 the stunned animal, designated by the numeral 73, is discharged upon inclined slide 74 for gravity conveyance to shackling pen 3. Slide 74 may be formed of sheet metal or other siutable material and is rigidly supported upon uprights 75, 76 and 77. Instead of slide 74, the animals may be discharged onto a moving conveyor for their conveyance to a distant point.

In shackling pen 3 the stunned animal, designated by the numeral 78, is shackled by an operator. The operator then hooks the shackle to chain 80 mounted on wheel 81 which rotates in a clockwise direction. As hook 82 of shackle 79 passes the rail 83, shackle 79 is taken from the wheel chain 80 by rail 83, whence the stunned animal passes by gravity down rail 83 for sticking.

I claim:

1. In an animal stunning pen, in combination with a substantially V-shaped conveying means comprising a pair of opposed conveyors inclined downwardly and inwardly and spaced apart at their lower longitudinal edges, means adapted for supporting an animal wholly out of engagement with the conveyors during initial upright travel of the animal substantially centrally between and parallel with the opposed conveyors consisting of a fixed platform coextensive with a portion of the lower longitudinal edges of said conveyors.

2. In an animal stunning pen, in combination with a substantially V-shaped conveying means comprising a pair of opposed endless conveyors inclined downwardly and inwardly and spaced apart at their lower longitudinal edges, means adapted for supporting an animal wholly out of engagement with the conveyors during initial upright travel of the animal substantially centrally between and parallel with the opposed conveyors consisting of a fixed platform coextensive with a portion of and in parallel relationship with the lower longitudinal edges of said conveyors.

3. In an animal stunning pen, in combination with a substantially V-shaped conveying means comprising a pair of opposed endless conveyors inclined downwardly and inwardly and spaced apart at their lower longitudinal edges, a fixed, stationary platform coextensive with a portion of the lower longitudinal edges of said conveyors, the initial section of said platform being extended in substantially parallel relationship with the lower longitudinal edges of said conveyors and adapted for supporting an animal wholly out of engagement with the conveyors during initial upright travel of the animal substantially centrally between and parallel with the opposed conveyors, a second section of said platform being inclined downwardly away from the lower longitudinal edges of said conveyors, said second section being adapted to enable the animal gradually to lower itself into wedging relationship between said conveyors.

4. In an animal stunning pen, in combination with a substantially V-shaped conveying means comprising a pair of opposed endless conveyors inclined downwardly and inwardly and spaced apart at their lower longitudinal edges, a fixed, stationary platform coextensive with a portion of the lower longitudinal edges of said conveyors, the initial section of said platform being extended in substantially parallel relationship with the lower longitudinal edges of said conveyors and adapted for supporting an animal wholly out of engagement with the conveyors during initial upright travel of the animal substantially centrally between and parallel with the opposed conveyors, a second section of said platform being inclined downwardly away from the lower longitudinal edges of said conveyors, said second section being adapted to enable the animal gradually to lower itself into wedging relationship between said conveyors, the animal during its travel between that portion of said conveyors in advance of said second section of said platform being supported wholly by said conveyors.

RICHARD W. REGENSBURGER.

CERTIFICATE OF CORRECTION.

Patent No. 2,185,949.   January 2, 1940.

RICHARD W. REGENSBURGER.

It is hereby certified that error appears in the printed specification of the above numbered patent requiring correction as follows: Page 2, first column, line 49, and second column, line 16, for the word "belts" read conveyors; same page, second column, line 42, for "siutable" read suitable; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.